R. McNICOL.
BELT FASTENER.
APPLICATION FILED JUNE 15, 1918.

1,300,437.

Patented Apr. 15, 1919.

Inventor
ROY McNICOL

By  N. S. Kiel

Attorney

UNITED STATES PATENT OFFICE.

ROY McNICOL, OF LANARK, ONTARIO, CANADA.

BELT-FASTENER.

1,300,437. Specification of Letters Patent. Patented Apr. 15, 1919.

Application filed June 15, 1918. Serial No. 240,161.

*To all whom it may concern:*

Be it known that I, ROY MCNICOL, a subject of the King of Great Britain, residing at Lanark, Province of Ontario, Canada, have invented a new and useful Belt-Fastener; and I do hereby declare the following to be a full, clear, and exact description of the invention, such as will enable others skilled in the art to which it appertains to make and use the same.

The present invention relates to a belt fastener, and has for its object to provide a device of this character which embodies novel features of construction whereby the two ends of a belt can be securely fastened together without the necessity of using the conventional lacing.

Further objects of the invention are to provide a hinged belt fastener which can be readily applied to the belt, which will securely grip the ends thereof without the necessity of using bolts or similar fastening members, which will not injure the belt, and which possesses the necessary flexibility to admit of the belt fastening around a pulley in the usual manner.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Corresponding and like parts are referred to in the following description and indicated in all the views of the drawings by the same reference characters.

Figure 1:
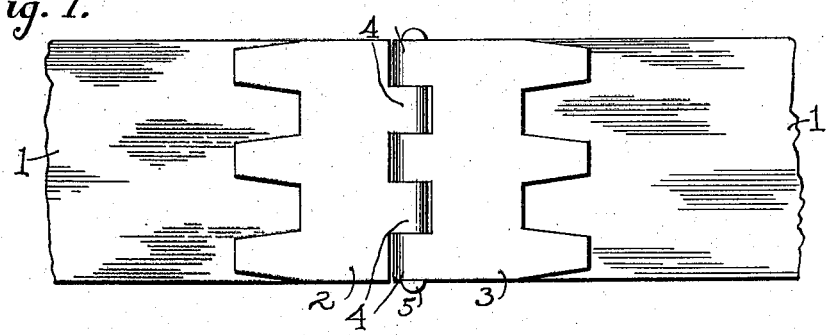
Figure 1 is a top plan view of a belt fastener constructed in accordance with the invention.
Figure 2:
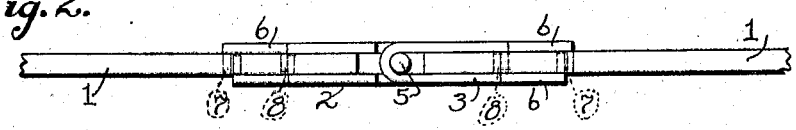
Fig. 2 is a side elevation of the belt fastener.
Figure 3:
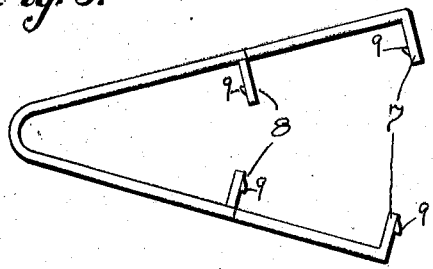
Fig. 3 is an enlarged side elevation of one of the clips, showing the same as sprung into an open position.
Figure 4:
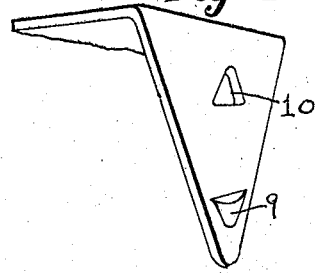
Fig. 4 is an enlarged detail view of one of the prongs.
Figure 5:
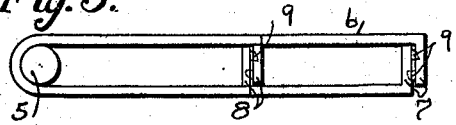
Fig. 5 is a side elevation of one of the clips, showing the same in a closed position.
Figure 6:
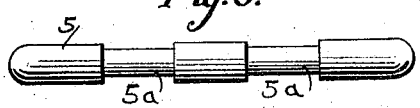
Fig. 6 is an enlarged detail view of the removable pintle.

Referring to the drawings, the numerals 1 designate the ends of a conventional belt which it is desired to fasten together by a flexible connection so that the belt will pass freely around a pulley in the usual manner. The present belt fastener includes a pair of complemental sheet metal clips 2 and 3, respectively, said clips being formed of heavy resilient material which has a strong spring action and will tightly grip the ends of the belt. The clips have a substantially U-shaped cross section, and the doubled ends thereof are cut away to provide complemental knuckles 4 which are intended to receive a removable pintle 5. Each of clips 2 and 3 has a width corresponding to the width of the belt, and the ends thereof are provided with a series of longitudinally extending arms 6 which terminate in inwardly projecting lateral prongs 7. A second set of prongs 8 project inwardly from the sides of each clip between the bases of the several arms 6. Each of the clips is thus provided with two sets of prongs 7 and 8, the corresponding prongs of each set having a complemental relation to each other and overlapping when the clip is in operative position. These prongs pass through corresponding openings in the belt 1, and each of the prongs may be provided at the nose thereof with a lateral locking lug 9 adapted to spring into an opening 10 in the base of the complemental prong when the device is assembled in operative position.

In order to apply the clips to the belt ends 1, the sides of each clip are forcibly sprung apart by the use of some suitable tool such as a screw-driver and the end of the belt inserted in position, after which the clip is released and the sides thereof permitted to spring into a tight engagement with the belt, the two sets of prongs 7 and 8 passing through the openings in the belt and the locking lug 9 of each prong engaging the opening 10 at the base of the complemental prong. No bolts or similar fastening members are required, the inherent resiliency of the clips being sufficient to hold them firmly in operative position. After the complemental clips 2 and 3 have been applied to the ends of the belt 1, the knuckles 4 of the two clips are brought into registry and the pintle 5 inserted into the same from one side of the fastener. This pintle may be formed with slightly reduced portions 5ª adapted to receive the knuckles 4 of one of the clips and coöperate therewith to prevent displacement of the pintle as long as the belt is under tension. This fastener can be readily applied to a belt or removed therefrom, and provides a flexible connection which admits of the belt passing freely around a pulley in the required manner.

Having thus described the invention, what I claim as new and desire to secure by Letters Patent, is:—

1. A belt fastener including a pair of complemental U-shaped spring clips formed of resilient material and adapted to be sprung upon the ends of the belt, the doubled ends of the clips being formed with complemental knuckles while the sides of the clips are provided with inwardly projecting belt engaging prongs, and a removable pintle inserted in the knuckles of the clips.

2. A belt fastener including a pair of U-shaped spring clips formed of resilient material and adapted to be sprung upon the ends of the belt, the folded ends of the clips being formed with complemental knuckles, while the sides of the clips are provided at the free ends thereof with longitudinally extending arms, one set of inwardly projecting belt engaging prongs being provided at the extremities of the arms, while another set of inwardly projecting belt engaging prongs is provided between the bases of the arms, and a pintle insertible through the complemental knuckles of the clips.

3. A belt fastener including a pair of U-shaped springs clips formed of resilient sheet material and adapted to be sprung upon the ends of the belt, the folded ends of the clips being cut away to provide complemental sets of knuckles while the sides of the clips are provided with inwardly projecting belt engaging prongs, said prongs having a complemental relation so as to overlap when the device is in operative position, and each of the prongs being provided with means for obtaining an interlocking connection with the other prong, and a pintle insertible through the complemental knuckles of the clips.

4. A belt fastener including a pair of U-shaped spring clips formed of resilient sheet material and adapted to be sprung upon the ends of the belt, the folded ends of the clips being cut away to provide complemental knuckles, while the sides of the clips are provided with complemental sets of inwardly projecting belt engaging prongs, each of the prongs being provided with an opening and also with a locking lug adapted to interlock with the opening of the complemental prongs, and a pintle insertible through the knuckles of the clips.

5. A belt fastener including a pair of U-shaped spring clips formed of resilient sheet material and adapted to be sprung upon the ends of a belt, the folded ends of the webs being cut away to provide complemental knuckles, while the sides of the clips are provided at the free ends thereof with longitudinally projecting arms, one set of complemental belt engaging prongs being provided at the extremities of the arms and another set of complemental belt engaging prongs being provided between the bases of the arms, each of the prongs being provided with an opening and also with a locking lug adapted to enter the opening of the complemental prong when the device is in operative position, and a pintle insertible through the knuckles of the clips.

6. A belt fastener including a pair of U-shaped clips formed of sheet material and adapted to be fitted upon the ends of a belt, the folded ends of the clips being cut away to provide complemental sets of knuckles, and a pintle insertible in the knuckles and provided with reduced portions adapted to receive one set of knuckles and coöperate therewith to lock the pintle in position while the belt is under tension.

In testimony whereof, I have signed my name to this specification, in the presence of two subscribing witnesses.

ROY McNICOL.

Witnesses:
GEO. J. HUNT,
JNO. MACLEAN.

Copies of this patent may be obtained for five cents each, by addressing the "Commissioner of Patents, Washington, D. C."